(12) United States Patent
Okada et al.

(10) Patent No.: US 9,102,810 B2
(45) Date of Patent: Aug. 11, 2015

(54) ALKALINE EARTH METAL CARBONATE MICROPOWDER

(75) Inventors: Fumio Okada, Ube (JP); Takeshi Himoto, Ube (JP); Masayuki Fujimoto, Ube (JP)

(73) Assignee: UBE MATERIAL INDUSTRIES, LTD., Ube-shi, Yamaguchi ( * ) Notice: Subject to any disclaimer, the term of this patent is extended or adjusted under 35 U.S.C. 154(b) by 0 days.

(21) Appl. No.: 13/985,328

(22) PCT Filed: Feb. 15, 2012

(86) PCT No.: PCT/JP2012/053480
§ 371 (c)(1),
(2), (4) Date: Oct. 29, 2013

(87) PCT Pub. No.: WO2012/111692
PCT Pub. Date: Aug. 23, 2012

(65) Prior Publication Data
US 2014/0053757 A1    Feb. 27, 2014

(30) Foreign Application Priority Data

Feb. 15, 2011   (JP) .................. 2011-029946

(51) Int. Cl.

| | |
|---|---|
| C01F 11/18 | (2006.01) |
| C09C 3/08 | (2006.01) |
| C09C 1/02 | (2006.01) |
| C08K 3/26 | (2006.01) |
| C01F 11/08 | (2006.01) |
| C08K 5/09 | (2006.01) |
| B82Y 30/00 | (2011.01) |

(52) U.S. Cl.
CPC . C08K 3/26 (2013.01); B82Y 30/00 (2013.01); C01F 11/08 (2013.01); C08K 5/09 (2013.01); C09C 1/02 (2013.01); C09C 1/021 (2013.01); C09C 1/024 (2013.01); C09C 3/08 (2013.01); *C01P 2004/52* (2013.01); *C01P 2004/54* (2013.01); *C01P 2004/62* (2013.01); *C01P 2004/64* (2013.01)

(58) Field of Classification Search
CPC ............ C09C 1/02; C09C 1/021; C09C 3/08; C08K 3/26; C08K 3/265; C08K 5/09; C01F 11/185; C01P 2004/52; C01P 2004/54; C01P 2004/625; C01P 2004/64; B82Y 30/00
USPC .................................................. 106/463, 465
See application file for complete search history.

(56) References Cited

U.S. PATENT DOCUMENTS

| | | | | |
|---|---|---|---|---|
| 4,407,986 | A  * | 10/1983 | Nomura et al. ............... | 523/200 |
| 7,341,625 | B2 * |  3/2008 | Amirzadeh-Asl ............ | 106/400 |
| 7,341,704 | B2 * |  3/2008 | Kasahara et al. .......... | 423/419.1 |
| 2004/0092639 | A1 * |  5/2004 | Kasahara et al. ............. | 524/425 |
| 2006/0137574 | A1 * |  6/2006 | Preston et al. ................ | 106/464 |
| 2012/0283368 | A1 * | 11/2012 | Nagamatsu et al. .......... | 524/130 |

FOREIGN PATENT DOCUMENTS

| | | | | |
|---|---|---|---|---|
| JP | 11-60950 | A | * | 3/1999 |
| JP | 2002-220547 | A | * | 8/2002 |
| JP | 2008-15118 | A | * | 1/2008 |
| JP | 2008-101051 | A | * | 5/2008 |

* cited by examiner

*Primary Examiner* — Anthony J Green
(74) *Attorney, Agent, or Firm* — Nixon Peabody LLP; Jeffrey L. Costellia

(57) ABSTRACT

Dispersibility of an alkaline earth metal carbonate micropowder in a polymer resin or in an organic solvent is improved by treating the surface of the alkaline earth metal micropowder with a surfactant having hydrophilic groups and hydrophobic groups and groups that form anions in water.

7 Claims, 1 Drawing Sheet

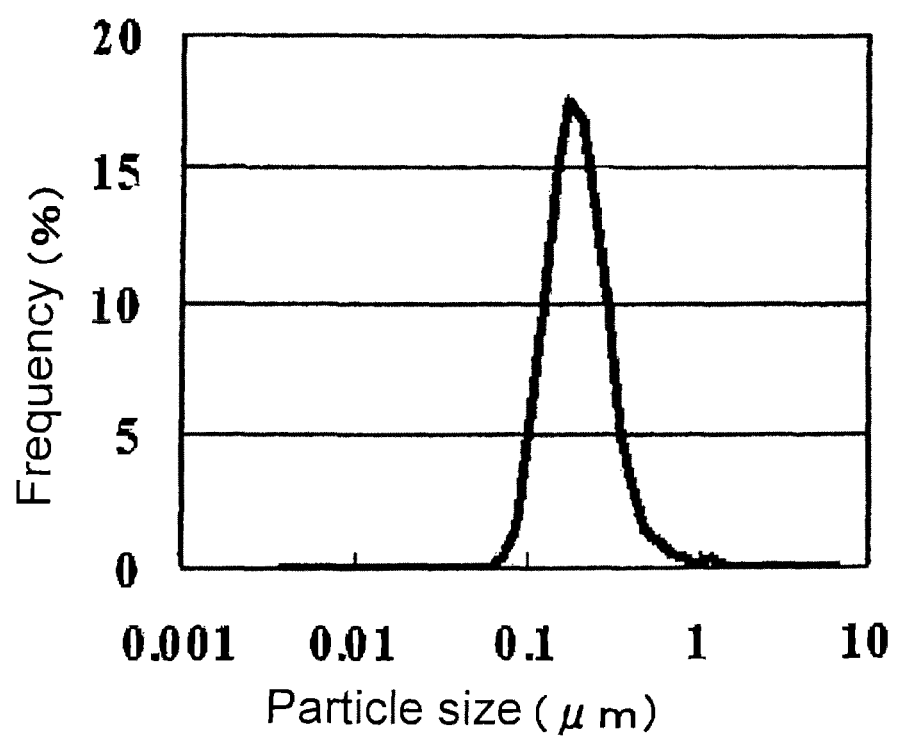

ALKALINE EARTH METAL CARBONATE MICROPOWDER

FIELD OF THE INVENTION

The present invention relates to an alkaline earth metal carbonate micropowder. The invention further relates to a dispersion comprising the alkaline earth metal carbonate micropowder dispersed in an organic solvent.

BACKGROUND OF THE INVENTION

An alkaline earth metal carbonate micropowder (i.e., fine powder) is widely used as filler for polymer resins.

D1 (JP 2008-101051 A) describes a resin film containing a filler comprising an alkaline earth metal carbonate micropowder of sub-micron size or nano size is well improved in its tensile strength and handling easiness such as prevention to blocking occurring in its winding procedure, keeping its transparency. D1 further describes that the alkaline earth metal carbonate micropowder of sub-micron size or nano size can be made resistant to aggregation in an organic solvent by wet-treating surfaces of the carbonate particles dispersed in an organic solvent with a surface-treating agent having a carboxylate group and then a dispersant such as a non-ionic surface active agent.

D2 (JP 2004-35347 A) describes that a non-birefringent optic resin material can be prepared by canceling birefringence formed in a polymer resin article owing to orientation of the polymer chain therein by dispersing acicular strontium carbonate particles having a mean particle length of 500 nm or less therein under such condition that the direction of the length of the carbonate particles is aligned in parallel with or vertical to the direction of the extended polymer chain. D2 further discloses methods for producing the non-birefringent optic resin materials such as a method of spreading a polymer solution comprising a polymer resin and an acicular strontium carbonate powder in an organic solvent on a glass plate to form a polymer solution film, evaporating the solvent from the polymer solution film, and extending the polymer film, and a method of kneading an acicular strontium carbonate powder and a polymer resin to form pellets and molding the thus formed pellets in an injection machine to give a polymer resin plates.

As is described in D1 and D2, particulate or acicular alkaline earth metal micropowders comprising particles of sub-micron size or nano size have been studied for the use as fillers for polymer resins. There are problems, however, that once-dried alkaline earth metal carbonate micropowder easily forms aggregates, and hence it is difficult to disperse the dry alkaline earth metal carbonate micropowder in an organic solvent to form a dispersion in which the micropowder is dispersed in the form of primary particles or the like. In this connection, D1 describes a method for preventing formation of aggregates of the carbonate particles which are once dispersed in an organic solvent. However, D1 is silent with respect to methods for dispersing a dry alkaline earth metal carbonate micropowder in an organic solvent to give a dispersion in which the carbonate micropowder is dispersed in the form of primary particles or the like.

SUMMARY OF THE INVENTION

Accordingly, it is an object of the invention to provide an alkaline earth metal carbonate micropowder (dry powder) that is easily dispersed in polymer resin or organic solvent to give a dispersion in which the carbonate micropowder is dispersed in the form of primary particles or the like. It is another object of the invention to provide a dispersion in which the alkaline earth metal carbonate micropowder is dispersed in the form of primary particles or the like and which can be easily produced.

The inventors of the present invention have discovered that dispersibility of an alkaline earth metal carbonate micropowder in polymer resins or organic solvents, particularly in the organic solvents, can be improved by treating the surface of carbonate micropowder with a surfactant having a hydrophilic group and a hydrophobic group and further a group forming an anion in water. The present invention has been made on the above-mentioned discovery.

Accordingly, in one aspect, there is provided by the invention an alkaline earth metal micropowder having been treated with a surfactant having a hydrophilic group and a hydrophobic group and further a group forming an anion in water.

Preferred embodiments of the invention are described below.

(1) The group forming an anion is carboxylic acid group, sulfuric acid group, or phosphoric acid group.

(2) The hydrophilic group of the surfactant is an oxyalkylene group having 1 to 4 carbon atoms.

(3) The hydrophobic group of the surfactant is an alkyl group having 3 to 30 carbon atoms, phenyl group, or an alkylphenyl group having 7 to 30 carbon atoms.

(4) The alkaline earth metal micropowder comprises particles having a mean size in the range of 10 to 200 nm.

(5) The alkaline earth metal micropowder comprises acicular particles having a mean length in the range of 10 to 500 nm and a mean aspect ratio in the range of 2 to 10.

(6) The alkaline earth metal micropowder is strontium carbonate micropowder.

In another aspect, there is provided by the invention a dispersion comprising the above-mentioned alkaline earth metal micropowder of the invention in an organic solvent.

In a further aspect, there is provided by the invention a process for preparing an alkaline earth metal carbonate micropowder improved in its dispersibility in an organic solvent, which comprises the steps of:

bringing an alkaline earth metal carbonate micropowder comprising particles of a mean size in the range of 10 to 200 nm into contact with a surfactant having a hydrophilic group and a hydrophobic group and further a group forming an anion in water in an aqueous suspension, and drying the thus treated alkaline earth metal carbonate micropowder.

In a still further aspect, there is provided by the invention a process for preparing an alkaline earth metal carbonate micropowder improved in its dispersibility in an organic solvent, which comprises the steps of:

bringing an acicular particles having a mean length in the range of 10 to 500 nm and a mean aspect ratio in the range of 2 to 10 into contact with a surfactant having a hydrophilic group and a hydrophobic group and further a group forming an anion in water in an aqueous suspension, and drying the thus treated alkaline earth metal carbonate micropowder.

Effects of the Invention

The alkaline earth metal carbonate micropowder of the invention is well dispersible in polymer resins and organic solvents. Therefore, when the alkaline earth metal carbonate micropowder is employed as a filler for polymer resin materials, the carbonate micropowder can be well dispersed in the polymer resin materials in the form of primary particles or the like. Specifically, a polymer resin film in which primary particles or the like of the alkaline earth metal carbonate powder are dispersed can be produced by dissolving a polymer resin in a dispersion of the invention, spreading the thus prepared dispersion and drying the spread dispersion.

BRIEF DESCRIPTION OF DRAWING

FIGURE is a graph indicating frequency distribution of particle size of the acicular strontium carbonate particles dispersed in the dispersion which was prepared in Example 1.

PREFERRED EMBODIMENTS OF THE INVENTION

The surface of the alkaline earth metal carbonate micropowder of the invention is treated with a surfactant having a hydrophilic group and a hydrophobic group and further a group forming an anion in water, the latter group being different from the above-mentioned hydrophilic group.

In the surfactant employed in the invention, it is preferred that the hydrophilic group is combined with the hydrophobic group and that the hydrophilic group is combined with the group forming an anion in water. It is also preferred that the group forming an anion is carboxylic acid group ($-CO_2H$), sulfuric acid group ($-OSO_3H$), or phosphoric acid group ($-OPO_2H_2$). The hydrogen atoms of these groups may be replaced with an alkali metal such as sodium or potassium or ammonium. The hydrophilic group preferably is an oxyalkylene group having 1 to 4 carbon atoms. The hydrophobic group preferably is an alkyl group having 3 to 30 carbon atoms, phenyl group, or an alkylphenyl group having 7 to 30 carbon atoms.

The surfactant having carboxylate group as the anion-forming group preferably is represented by the following formula (I):

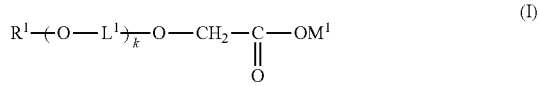

(I)

In the formula (I), $R^1$ stands for an alkyl group having 3 to 30 carbon atoms, phenyl group, or an alkylphenyl group having 7 to 30 carbon atoms; $L^1$ stands for an alkylene group having 1 to 4 carbon atoms; $M^1$ stands for hydrogen, an alkali metal, or ammonium; and k is a number in the range of 2 to 10. $R^1$ preferably is an alkyl group or alkyl phenyl group having 10 to 18 carbon atoms. $L^1$ preferably is ethylene group.

The surfactant having sulfuric acid group as the anion-forming group preferably is represented by the following formula (II):

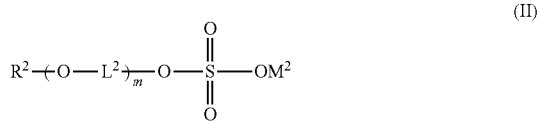

(II)

In the formula (II), $R^2$ stands for an alkyl group having 3 to 30 carbon atoms, phenyl group, or an alkylphenyl group having 7 to 30 carbon atoms; $L^2$ stands for an alkylene group having 1 to 4 carbon atoms; $M^2$ stands for hydrogen, an alkali metal, or ammonium; and m is a number in the range of 2 to 10. $R^2$ preferably is an alkyl group or alkyl phenyl group having 12 to 18 carbon atoms.

The surfactant having phosphoric acid group as the anion-forming group preferably is represented by the following formula (III):

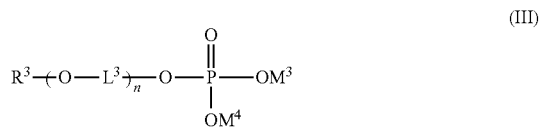

(III)

In the formula (III), $R^3$ stands for an alkyl group having 3 to 30 carbon atoms, phenyl group, or an alkylphenyl group having 7 to 30 carbon atoms; $L^3$ stands for an alkylene group having 1 to 4 carbon atoms; $M^3$ and $M^4$ independently stand for hydrogen, an alkali metal, or ammonium; and n is a number in the range of 2 to 10. $R^3$ preferably is an alkyl group or alkyl phenyl group having 12 to 18 carbon atoms.

The surface of the alkaline earth metal carbonate micropowder can be treated or brought into contact with the above-mentioned surfactant in an aqueous carbonate micropowder dispersion, and subsequently dried.

The surfactant can be fixed onto the surface of the alkaline earth metal carbonate micropowder via an anion formed in the aqueous dispersion.

The alkaline earth metal carbonate powder can be brought into contact with the surfactant in the aqueous dispersion by adding the surfactant to an aqueous dispersion in which the alkaline earth metal carbonate micropowder is dispersed; adding the alkaline earth metal carbonate micropowder to an aqueous solution in which the surfactant is dissolved; or simultaneously adding the surfactant and the alkaline earth metal carbonate micropowder to water. The surfactant is preferably used generally in an amount of 1 to 30 weight parts, preferably 5 to 20 weight parts, per 100 weight parts of the alkaline earth metal carbonate micropowder. The alkaline earth metal carbonate micropowder can be dried by means of a spray dryer.

Examples of the alkaline earth metal carbonate micropowders include magnesium carbonate micropowder, calcium carbonate micropowder, strontium carbonate micropowder and barium carbonate micropowder. Strontium carbonate micropowder is preferred.

There are no specific limitations with respect to the form of the particles of the alkaline earth metal carbonate micropowder. For instance, granular particles having a mean aspect ratio (length/width) of not more than 2 (particularly 1.5 or less) can be employed. Also employed are acicular particles having a mean aspect ratio of 2 or more (particularly 2.5 or more). The granular particles preferably have a mean particle size in the range of 10 to 200 nm. The acicular particles preferably have a mean length in the range of 10 to 500 nm, more preferably in the range of 10 to 200 nm. The acicular particles preferably have an aspect ratio in the range of 2 to 10, more preferably in the range of 2.5 to 10.

The granular particles of strontium carbonate can be prepared by, for instance, introducing gaseous carbon dioxide into a stirred aqueous solution or dispersion of strontium hydroxide so as to produce strontium carbonate particles and subsequently pulverizing the strontium carbonate particles. The solution or dispersion of strontium hydroxide generally contains strontium hydroxyide in an amount of 1 to 20 wt. %, preferably 2 to 15 wt. %, more preferably 3 to 8 wt. %. The gaseous carbon dioxide is generally introduced in an amount of 0.5 to 200 mL/min., preferably 0.5 to 100 mL/min., more preferably 1 to 50 mL/min., per one gram of strontium hydroxide in the solution or dispersion. It is preferred that a carboxylic acid having hydroxyl group is placed in the solution or dispersion of strontium hydroxide when strontium hydroxide is converted into strontium carbonate by carbonation. Examples of the carboxylic acids having hydroxyl group include citric acid, tartaric acid, malic acid, and gluconic acid. The carboxylic acid having hydroxyl group can be preferably used generally in an amount of 0.1 to 20 weight parts, preferably 1 to 10 weight parts, per 100 weight parts of strontium hydroxyide.

The acicular strontium carbonate particles can be prepared, for instance, by introducing gaseous carbon dioxide into a stirred aqueous solution or dispersion of strontium hydroxide in the presence of a dicarboxylic acid having the below-mentioned formula (IV) for carboxylating the strontium hydroxide.

HOOC-L-COOH  (IV)

In the formula (IV), L stands for a divalent linear hydrocarbon group having 1 to 4 carbon atoms. The linear hydrocarbon group may contain a double bond and generally contains 1 to 3 carbon atoms, preferably 1 or 2 carbon atoms. The linear hydrocarbon group is preferably contains no hydroxyl group. Whole or a part of hydrogens of the linear hydrocarbon group are preferably replaced with an alkyl group having 1 to 6 carbon atoms, particularly methyl or ethyl.

Examples of the dicarboxylic acids advantageously employed in the preparation of acicular strontium carbonate particles include methylmalonic acid, dimethylmalonic acid, ethylmalonic acid, diethylmalonic acid, methylsuccivic acid, 2,2-dimethylsuccinic acid, 2,3-dimethylsuccinic acid, methylmaleic acid (citraconic acid) and dimethylmaleic acid. The dicarboxylic acid is preferably dissolved in the aqueous solution or dispersion of strontium hydroxide preferably in an amount of 1 to 20 weight parts, more preferably 2 to 15 weight parts, per 100 weight parts of strontium hydroxide. The amount of strontium hydroxide and the amount of gaseous carbon dioxide are the same as those described in the preparation of the granular particles.

The alkaline earth metal carbonate micropowder of the invention is highly dispersible in organic solvents, and can be dispersed in an organic solvent in the form of primary particles or the like by applying conventional dispersing procedure such as stirring or dispersing by means of microwave. The organic solvents in which the alkaline earth metal carbonate micropowder is dispersed preferably are polar organic solvents. Examples of the polar organic solvents include alcohols (e.g., ethanol, 1-propanol, 2-propanol, 1-butanol, and ethylene glycol), methylene chloride and tetrahydrofuran. Preferred are methylene chloride and tetrahydrofuran.

EXAMPLES

Example 1

(1) Preparation of Aqueous Dispersion of Strontium Carbonate Particles

In 3 L of pure water (temperature: 40° C.) was placed 366 g of strontium hydroxide octahydrates, and the mixture was stirred to prepare an aqueous strontium hydroxyide dispersion (concentration: 5.6 wt. %). In the aqueous strontium hydroxide dispersion was placed 8.6 g (5.1 weight parts per 100 weight parts of strontium hydroxide) of dimethylmalonic acid, and the mixture was stirred to dissolve the dimethylmalonic acid in the aqueous dispersion. Into the resulting aqueous strontium hydroxide dispersion kept at 40° C. was introduced under stirring a gaseous carbon dioxide at a flow rate of 0.5 L/min. (3.0 mL/min., per one gram of strontium hydroxide), until the aqueous dispersion showed pH 7, whereby producing strontium carbonate particles. The stirring was continued further for 30 minutes to obtain the desired aqueous dispersion of strontium carbonate particles.

(2) Preparation of Strontium Carbonate Micropowder Whose Surface is Treated with Surfactant Having Hydrophilic Group, Hydrophobic Group and Carboxylic Acid Group In the aqueous dispersion of strontium carbonate particles obtained in (1) above was placed 20 g (10 weight parts per 100 weight parts of strontium carbonate) of a surfactant having the below-mentioned formula (V):

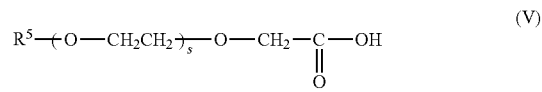
(V)

(in the formula, $R^5$ is an alkyl group having 10 to 15 carbon atoms and s is a number in the range of 2 to 7.)

The mixture was stirred for one hour by means of a homomixer (T.K. Homomixer Mark II, produced by Primix Co., Ltd.) under such condition that the stirring paddle was rotated at a circumferential speed of 7.85 m/sec. After the stirring was complete, the aqueous strontium carbonate dispersion was dried in a drum dryer to obtain the desired strontium carbonate micropowder.

Scanning Electron Microscopic (SEM) observation indicated that the obtained strontium carbonate micropowder comprises acicular particles. Further, the aspect ratios and lengths of 300 acicular strontium carbonate particles were measured by analyzing an enlarged view of the SEM image. It was determined that the mean aspect ratio was 2.70 and the mean length was 110 nm. Furthermore, it was determined that the obtained strontium carbonate micropowder had BET specific surface area of 48.7 m$^2$/g.

(3) Evaluation of Dispersibility of Strontium Carbonate Micropowder

The strontium carbonate micropowder (0.2 g) treated with a surfactant in (2) above was placed in 20 mL of methylene chloride. The resulting mixture was subjected to a ultrasonic dispersing procedure for 5 minutes using a ultrasonic homogenizer, to give a dispersion of strontium carbonate particles. The obtained dispersion was then subjected to determination of its mean particle size by means of a dynamic light-scattering particle size distribution measurement apparatus (Nanotrack UPA, produced by Nikkiso Co., Ltd.). It was determined that the mean particle size of the acicular strontium carbonate particles dispersed in the dispersion was 0.170 μm (170 nm). The thus determined mean particle size was substantially the same as the mean length (110 nm) determined from the enlarged view of SEM image. The frequency distribution of the particle sizes of the acicular strontium carbonate articles dispersed in the dispersion is illustrated in FIGURE.

FIGURE indicates that the particle sizes of the acicular strontium carbonate particles are distributed within the narrow width. Therefore, it is understood that the acicular strontium carbonate particles are dispersed in the dispersion in the form of primary particles or fine aggregated particles having similar sizes.

Example 2

The procedures of Example 1 were repeated except that dimethylmalonic acid was replaced with 8.6 g (5.1 weight parts per 100 weight parts of strontium hydroxide) of methylmaleic in the procedure of Example 1-(1) for the preparation of an aqueous dispersion of strontium carbonate particles, to obtain a dispersion of strontium carbonate micropowder treated with a surfactant having a hydrophilic group, a hydrophobic group, and carboxylic acid group. It was determined by the image analysis that the thus obtained strontium carbonate micropowder was an acicular powder having a mean aspect ratio of 2.78 and a mean length of 103 nm. The BET specific surface area of the micropowder was 57.0 m$^2$/g.

The obtained strontium carbonate micropowder (0.2 g) was dispersed in 20 mL of methylene chloride, and subjected to ultrasonic dispersing procedure using the ultrasonic homogenizer for 5 minutes, to obtain a dispersion of the strontium carbonate particles. It was determined that the mean particle size of strontium carbonate particles was 0.3 µm (300 nm). It was confirmed that the acicular strontium carbonate particles were uniformly dispersed in the dispersion.

Comparison Example 1

The aqueous suspension of strontium carbonate particles prepared in Example 1-(1) was dried in a drum dryer to give strontium carbonate micropowder. The strontium carbonate micropowder (0.2 g) was placed in 20 mL of methylene chloride, and subsequently subjected to ultrasonic dispersing procedure for 5 minutes using the ultrasonic homogenizer, to give a dispersion of strontium carbonate particles.

It was determined that the mean particle size of the acicular strontium carbonate particles in the dispersion was 1.4 µm (1400 nm). Thus, it was found that the dispersibility of the acicular strontium carbonate particles obtained in this Example was lower than that of the acicular strontium carbonate particles obtained in Example 1 above.

What is claimed is:

1. An alkaline earth metal carbonate micropowder comprising particles having a mean size in the range of 10 to 200 nm or acicular particles having a mean length in the range of 10 to 500 nm and a mean aspect ratio in the range of 2 to 10 and having been treated with a surfactant having a hydrophilic group, a hydrophobic group, and a carboxylic acid group.

2. The alkaline earth metal carbonate micropowder of claim 1, in which the hydrophilic group of the surfactant is an oxyalkylene group having 1 to 4 carbon atoms.

3. The alkaline earth metal carbonate micropowder of claim 1, in which the hydrophobic group of the surfactant is an alkyl group having 3 to 30 carbon atoms, phenyl group, or an alkylphenyl group having 7 to 30 carbon atoms.

4. The alkaline earth metal carbonate micropowder of claim 1, in which the alkaline earth metal carbonate micropowder is strontium carbonate micropowder.

5. A dispersion comprising an alkaline earth metal carbonate micropowder of claim 1 in an organic solvent.

6. A process for preparing an alkaline earth metal carbonate micropowder improved in its dispersibility in an organic solvent, which comprises the steps of:
   bringing an alkaline earth metal carbonate micropowder comprising particles of a mean size in the range of 10 to 200 nm into contact with a surfactant having a hydrophilic group, a hydrophobic group, and a carboxylic acid group in an aqueous suspension, and
   drying the thus treated alkaline earth metal carbonate micropowder.

7. A process for preparing an alkaline earth metal carbonate micropowder improved in its dispersibility in an organic solvent, which comprises the steps of:
   bringing an alkaline earth metal carbonate micropowder comprising acicular particles having a mean length in the range of 10 to 500 nm and a mean aspect ratio in the range of 2 to 10 into contact with a surfactant having a hydrophilic group, a hydrophobic group, and a carboxylic acid group in an aqueous suspension, and
   drying the thus treated alkaline earth metal carbonate micropowder.

* * * * *